US011209988B2

(12) United States Patent
Lyu

(10) Patent No.: US 11,209,988 B2
(45) Date of Patent: Dec. 28, 2021

(54) DYNAMIC STORAGE VOLUME DISTRIBUTION ACCORDING TO WEARING LEVEL

(71) Applicant: International Business Machines Corporation, Armonk, NY (US)

(72) Inventor: Gang Lyu, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 80 days.

(21) Appl. No.: 16/418,106

(22) Filed: May 21, 2019

(65) Prior Publication Data
US 2020/0371693 A1 Nov. 26, 2020

(51) Int. Cl.
*G06F 12/00* (2006.01)
*G06F 3/06* (2006.01)

(52) U.S. Cl.
CPC .......... *G06F 3/0616* (2013.01); *G06F 3/0644* (2013.01); *G06F 3/0659* (2013.01); *G06F 3/0689* (2013.01)

(58) Field of Classification Search
CPC .............................. G06F 3/0616; G06F 3/0689
See application file for complete search history.

(56) References Cited

U.S. PATENT DOCUMENTS

| 7,373,559 | B2 * | 5/2008 | Guha | G06F 11/008 |
| | | | | 714/54 |
| 8,065,558 | B2 * | 11/2011 | Zwisler | G06F 11/1092 |
| | | | | 714/6.22 |
| 8,639,877 | B2 | 1/2014 | Benhase et al. | |
| 8,694,400 | B1 * | 4/2014 | Certain | G06Q 30/08 |
| | | | | 705/35 |
| 9,606,915 | B2 | 3/2017 | Horspool et al. | |
| 2015/0100721 | A1 * | 4/2015 | Koseki | G06F 11/108 |
| | | | | 711/103 |
| 2017/0115901 | A1 | 4/2017 | Franke et al. | |
| 2017/0185331 | A1 | 6/2017 | Gao et al. | |
| 2017/0228161 | A1 * | 8/2017 | Nangoh | G06F 3/0604 |
| 2019/0220207 | A1 * | 7/2019 | Lingarajappa | G06F 3/0689 |

OTHER PUBLICATIONS

Anonymous, "Method and System for Optimizing Wear Leveling at RAID Level," IP.com Disclosure No. IPCOM000204359D, Feb. 21, 2011, 4 pages. <https://priorart.ip.com/IPCOM/000204359>.
Mell et al., "The NIST Definition of Cloud Computing", Recommendations of the National Institute of Standards and Technology, Sep. 2011, 7 pages.

\* cited by examiner

*Primary Examiner* — Baboucarr Faal
(74) *Attorney, Agent, or Firm* — Stosch S. Sabo

(57) ABSTRACT

A method for operating a storage controller reduces a probability of data loss in a storage system having redundant arrays of independent storage volumes (RAID) by identifying an old storage volume in a first location of a first RAID array of the storage system, and further by exchanging the old storage volume in the first location of the first RAID array with a second storage volume in a second location of a second RAID array of the storage system.

20 Claims, 14 Drawing Sheets

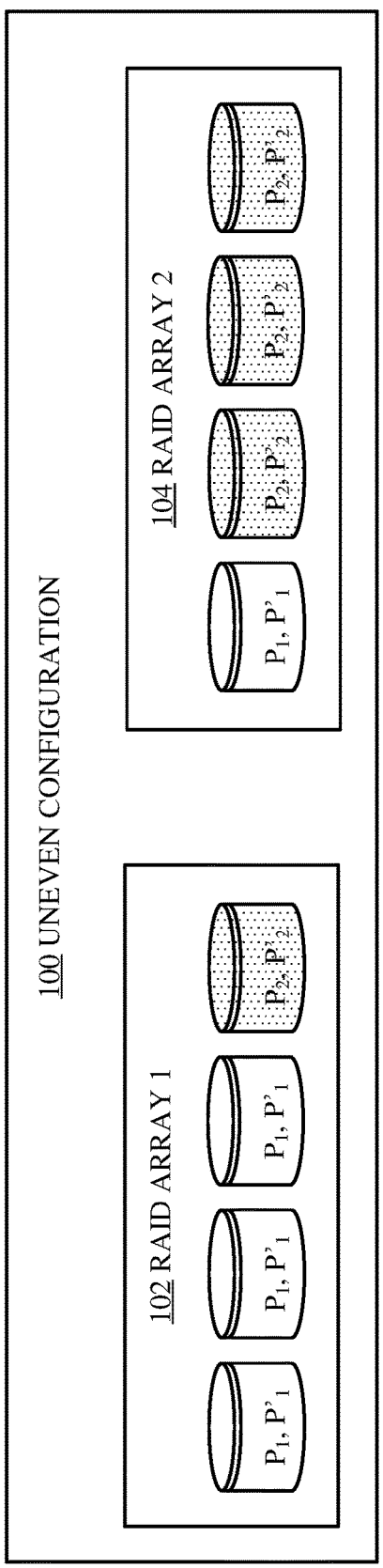
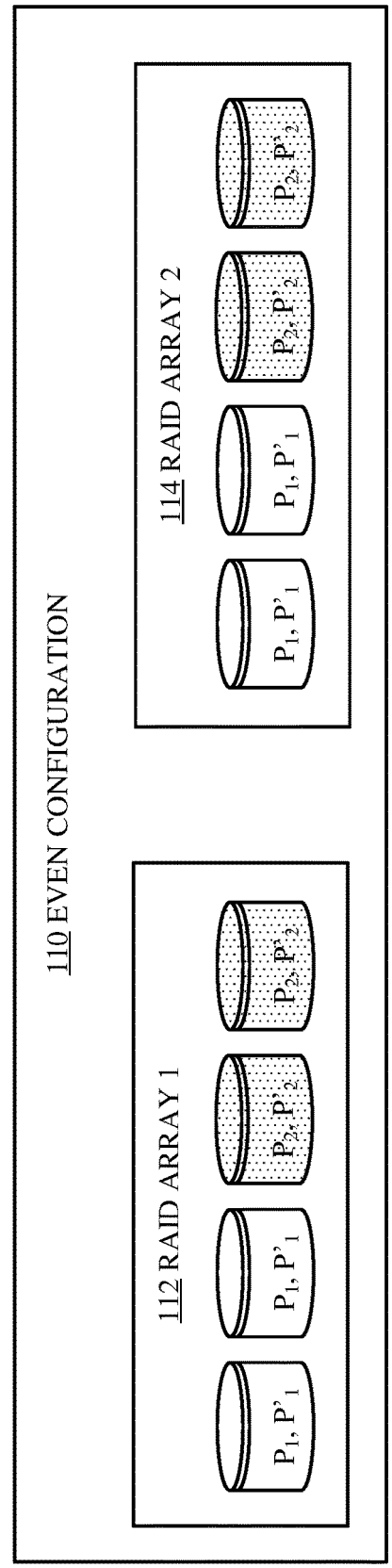
FIG. 1A
FIG. 1B

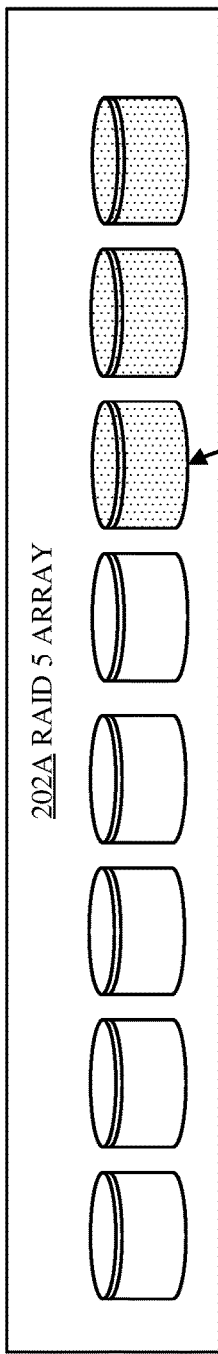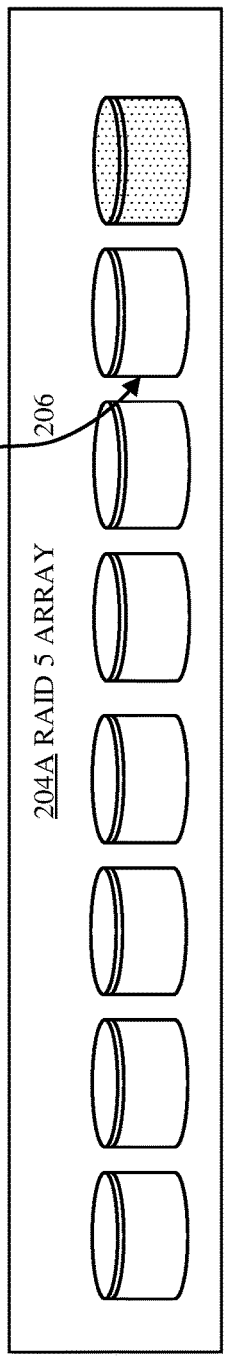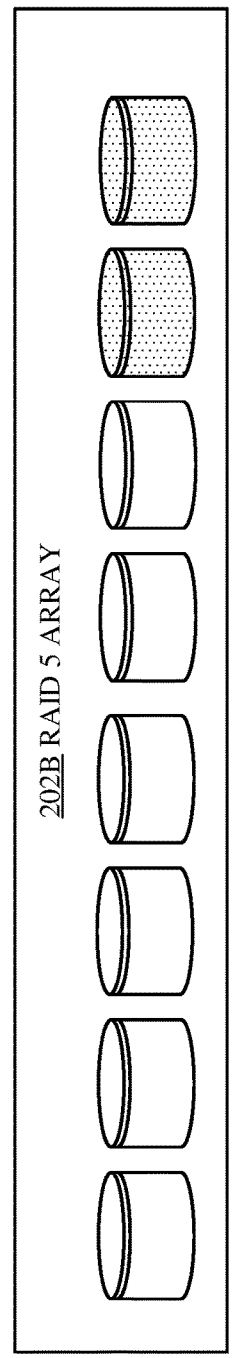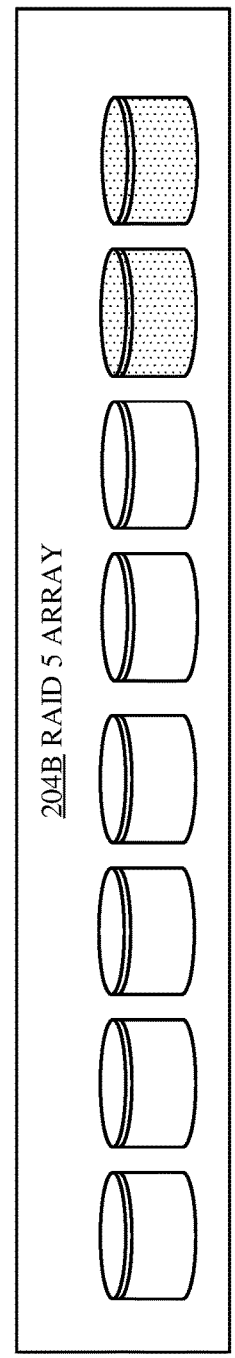
FIG. 2A
FIG. 2B

DYNAMIC STORAGE VOLUME DISTRIBUTION ACCORDING TO WEARING LEVEL

BACKGROUND

The present disclosure relates to data storage, and, more specifically, to storage volume distribution in redundant arrays of independent disks (RAID).

RAID is a data storage virtualization technology that combines multiple physical storage volumes into one or more logical units for the purposes of data redundancy, performance improvement, or both. RAID controllers (e.g., device adapters, storage controllers, etc.) manage one or more RAID arrays. The RAID controller can be attached to one or more spare storage volumes that can be used to replace a failed storage volume of the RAID array.

SUMMARY

Aspects of the present disclosure are directed toward a computer-implemented method for reducing a probability of data loss in a storage system having redundant arrays of independent disks (RAID), the method comprising identifying an old storage volume in a first location of a first RAID array of the storage system. The method further comprising exchanging the old storage volume in the first location of the first RAID array with a second storage volume in a second location of a second RAID array of the storage system. The first RAID array and the second RAID array are a same type of RAID array, and exchanging the old storage volume with the second storage volume causes the first RAID array to have an equal number of old storage volumes as the second RAID array.

Further aspects of the present disclosure are directed toward a computer-implemented method for reducing a probability of data loss in a storage system having redundant arrays of independent disks (RAID), the method comprising identifying an old storage volume in a first location of a first RAID array of the storage system. The method further comprising exchanging the old storage volume in the first location of the first RAID array with a second storage volume in a second location of a second RAID array of the storage system. The first RAID array and the second RAID array are different types of RAID arrays, and the second RAID array has a higher tolerance for storage volume failures relative to the first RAID array. Exchanging the old storage volume with the second storage volume causes the first RAID array to have fewer old storage volumes than the second RAID array.

Further aspects of the present disclosure are directed toward a computer-implemented method for reducing a probability of data loss in a storage system having redundant arrays of independent disks (RAID) with mirrored pairs of storage volumes, the method comprising identifying a first pair of storage volumes having two old storage volumes in a RAID 10 mirrored array. The method further comprising exchanging a first storage volume of the first pair of storage volumes with a second storage volume of a second pair of storage volumes. The second pair of storage volumes contains no old storage volumes, and, as a result of the exchanging, the first pair of storage volumes and the second pair of storage volumes in the RAID 10 mirrored array each contain less than two old storage volumes.

Additional aspects of the present disclosure are directed to systems and computer program products configured to perform the methods described above. The present summary is not intended to illustrate each aspect of, every implementation of, and/or every embodiment of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

FIG. 1A illustrates an uneven configuration of storage volumes, in accordance with embodiments of the present disclosure.

FIG. 1B illustrates an even configuration of storage volumes, in accordance with embodiments of the present disclosure.

FIG. 2A illustrates an uneven configuration of storage volumes between two RAID 5 arrays, in accordance with embodiments of the present disclosure.

FIG. 2B illustrates an even configuration of storage volumes between two RAID 5 arrays, in accordance with embodiments of the present disclosure.

Figure 3A:
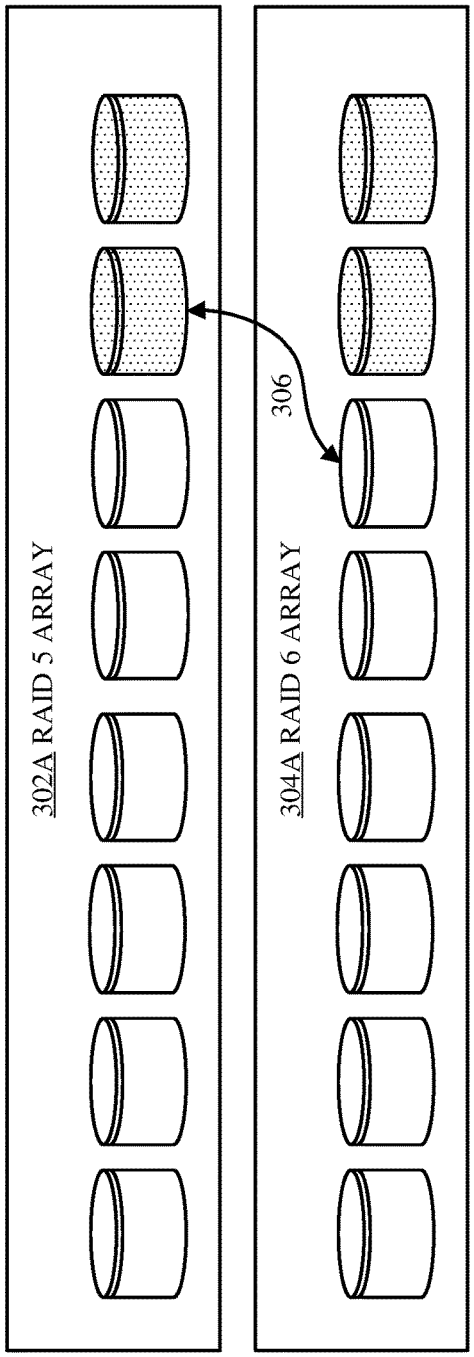
FIG. 3A illustrates an even configuration of storage volumes in a storage system containing a RAID 5 array and a RAID 6 array, in accordance with embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure are directed toward data storage, and, more specifically, to storage volume distribution in redundant arrays of independent disks (RAID). While not limited to such applications, embodiments of the present disclosure may be better understood in light of the aforementioned context.

Numerous types of RAID arrays exist, including, but not limited to, RAID 0 (e.g., data split evenly across two or more volumes), RAID 1 (e.g., mirrored data between two volumes), RAID 2 (e.g., data striped by bit with Hamming code for error correction), RAID 3 (e.g., data striped by byte with parity disk), RAID 4 (e.g., data striped by block with parity disk), RAID 5 (e.g., data striped by block with distributed parity), RAID 6 (e.g., data striped by block with two parity blocks on all member volumes), RAID 10 (e.g., RAID 1+0 where data is striped and mirrored), and/or other RAID arrays including non-standard RAID configurations and/or nested RAID configurations.

Storage volumes of a RAID array can experience mechanical failure as a result of age and/or accumulated write operations. While most RAID arrays can absorb one storage volume failure, multiple storage volume failures in a same time window can result in permanently lost data. In order to quantify the probability of data loss in a storage system having RAID arrays, exponential statistical distributions are typically used to calculate the probability that two storage volumes will fail within a given time window (e.g., 1-hour, 10-hours, etc.). However, these calculated probabilities often underestimate the true probability of data loss since the exponential statistical distribution assumes an independent and identical probability of failure for individual storage volumes. This is not accurate in most real-world applications where a RAID array can contain both old storage volumes and new storage volumes, and where the probability of failure of each storage volume is a function of time or use (e.g., older storage volumes typically have a higher likelihood of failure relative to newer storage volumes). Since the probability of failure for any given storage volume is related to its age (or accumulated write operations), the failure of two storage volumes within a same time window is statistically correlated in some RAID arrays having storage volumes of a similar age.

Aspects of the present disclosure are directed to overcoming the technical challenge of reducing a global probability of data loss in a storage system having one or more RAID arrays, where the one or more RAID arrays contain storage volumes having different ages, and, therefore, different probabilities of failure.

As used herein, the term storage volume can generally refer to solid state drives (SSDs) and/or hard disk drives (HDDs). Furthermore, storage volumes can refer to physical storage volumes or virtualized storage volumes, where the virtualized storage volumes are generated from a portion of, one of, or multiple physical storage volumes.

FIGS. 1A and 1B illustrate the effect of distribution of old storage volumes in a storage system on the probability of data loss within the storage system. FIG. 1A illustrates a block diagram of a RAID array in an uneven configuration 100 whereas FIG. 1B illustrates a block diagram of a RAID array in an even configuration 110. Uneven configuration 100 includes RAID array 1 102 having one older storage volume (shown as the patterned storage volume) and three newer storage volumes, whereas RAID array 2 104 has three older storage volumes and one newer storage volume. Uneven configuration 100 is referred to as "uneven" because it has a different number of older storage volumes between RAID array 1 102 and RAID array 2 104.

In contrast, even configuration 110 has two older storage volumes in RAID array 1 112 and two older storage volumes in RAID array 2 114. Since RAID array 1 112 and RAID array 2 114 include an equal number of older storage volumes, they are referred to as being in even configuration 110.

Each of the storage volumes illustrated in FIGS. 1A and 1B are associated with two probabilities. A first probability relating to the likelihood of storage volume failure during normal operation and a second probability relating to the likelihood of storage volume failure during array rebuilding for another failed storage volume (e.g., the likelihood of a second storage volume failure while the RAID array is rebuilding following a first storage volume failure). As will be appreciated by one skilled in the art, these two probabilities are different for newer storage volumes relative to older storage volumes.

As shown in FIGS. 1A and 1B, $P_1$ generally refers to the probability of a failure of a newer storage volume in a RAID array during normal operation. $P'_1$ generally refers to the probability of a failure of a newer storage volume in a RAID array that is rebuilding following a storage volume failure. $P_2$ generally refers to the probability of a failure of an older storage volume in a RAID array during normal operation. $P'_2$ generally refers to the probability of a failure of an older storage volume in a RAID array that is rebuilding following a storage volume failure.

Several relations between the four aforementioned probabilities are apparent. First, $P'_1 > P_1$ and $P'_2 > P_2$ (i.e., a storage volume has higher probability to report errors or fail during rebuilding operations than during normal operations). Second, $P_2 > P_1$ (i.e., it is more likely for an older storage volume to fail than a newer storage volume). Third, $P'_2 > P'_1$ (i.e., it is more likely for an older storage volume to fail during array rebuilding than it is for a newer storage volume to fail during array rebuilding).

From these relations, the probability of data loss can be calculated for the uneven configuration 100 and the even configuration 110. Specifically, the probability of data loss in the uneven configuration 100 of FIG. 1A can be calculated using Equation 1A, where $C_N^M$ refers to different combinations of failed storage volumes:

$$P(\text{uneven config}) = \frac{2C_3^2 P_1 P_1' + C_3^1 P_1 P_2' + C_3^1 P_2 P_1' + 2C_3^2 P_1 P_1' + C_3^1 P_1 P_2' + C_3^1 P_2 P_1'}{24}$$

Equation 1A

Equation 1A can be reduced to Equation 1B:

$$P(\text{uneven config}) = \frac{3P_1 P_1' + 3P_1 P_2' + 3P_2 P_1' + 3P_2 P_2'}{12}$$

Equation 1B

Likewise, the probability of data loss in the even configuration 110 of FIG. 1B can be calculated according to Equation 2A:

$$P(\text{even config}) = \frac{2(2C_2^2 P_1 P_1' + C_2^1 C_2^1 P_1 P_2' + C_2^1 C_2^1 P_2 P_1' + 2C_2^2 P_2 P_2')}{24}$$

Equation 2A

Equation 2A can be reduced to Equation 2B:

$$P(\text{even config}) = \frac{2P_1 P_1' + 4P_1 P_2' + 4P_2 P_1' + 2P_2 P_2'}{12}$$

Equation 2B

The probability of data loss in the even configuration 110 (e.g., Equation 2B) can be subtracted from the probability of data loss in the uneven configuration 100 (e.g., Equation 1B) in order to understand the relative size of the probability of data loss in the even configuration 110 compared to the probability of data loss in the uneven configuration 100. This is shown in Equation 3:

$$\frac{3P_1 P_1' + 3P_1 P_2' + 3P_2 P_1' + 3P_2 P_2'}{12} - \frac{2P_1 P_1' + 4P_1 P_2' + 4P_2 P_1' + 2P_2 P_2'}{12} = \frac{P_1 P_1' - P_1 P_2' - P_2 P_1' + P_2 P_2'}{12}$$

Equation 3

Equation 3 can be simplified to the inequality shown in Equation 4:

$$\frac{(P_2 - P_1)(P_2' - P_1')}{12} > 0$$

Equation 4

Equation 4 demonstrates that P(uneven config)>P(even config). In other words, the uneven configuration 100 of FIG. 1A has a higher probability of data loss than the even configuration 110 of FIG. 1B. Thus, there is a benefit to equally distributing older storage volumes in RAID arrays of a similar type.

Aspects of the present disclosure are directed to techniques for dynamically redistributing older storage volumes within RAID arrays to reduce a global possibility of data loss in a storage system.

Figure 3B:
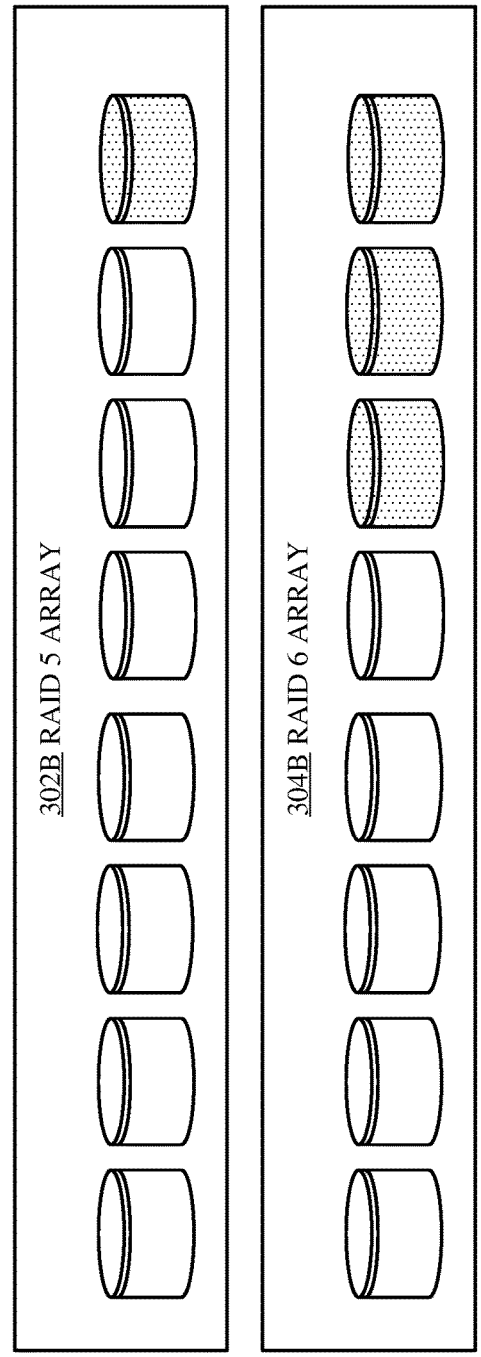
FIG. 3B illustrates an uneven configuration of storage volumes in a storage system containing a RAID 5 array and a RAID 6 array, in accordance with embodiments of the present disclosure.
Figure 4A:
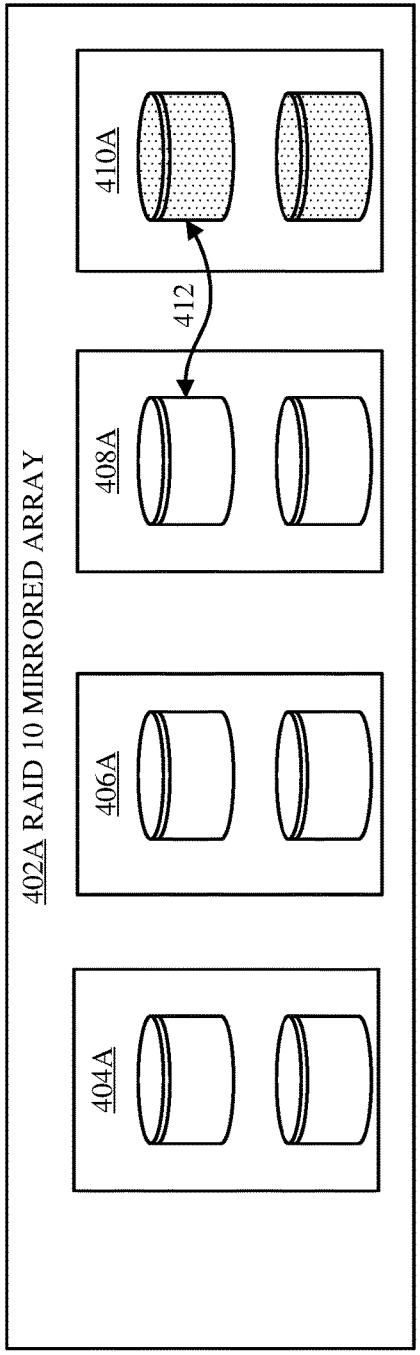
FIG. 4A illustrates a pair of old storage volumes in a RAID 10 mirrored array, in accordance with embodiments of the present disclosure.
Figure 4B:
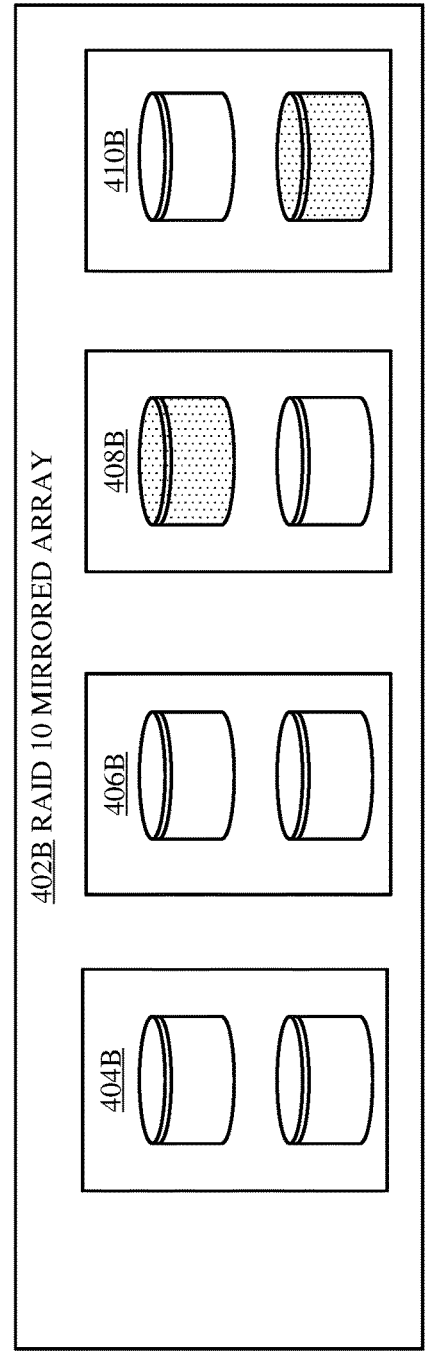
FIG. 4B illustrates old storage volumes distributed across pairs in a RAID 10 mirrored array, in accordance with embodiments of the present disclosure.
Figure 5A:
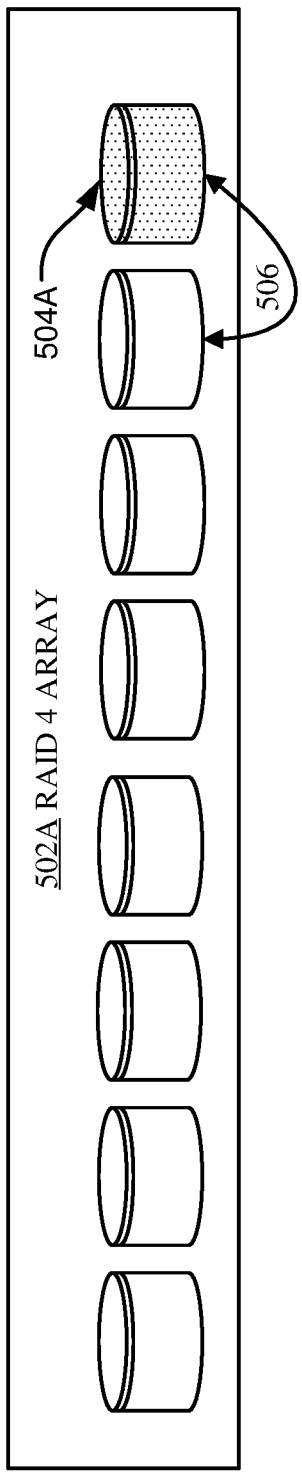
FIG. 5A illustrates a RAID 4 array having an old storage volume as a parity disk, in accordance with embodiments of the present disclosure.
Figure 5B:
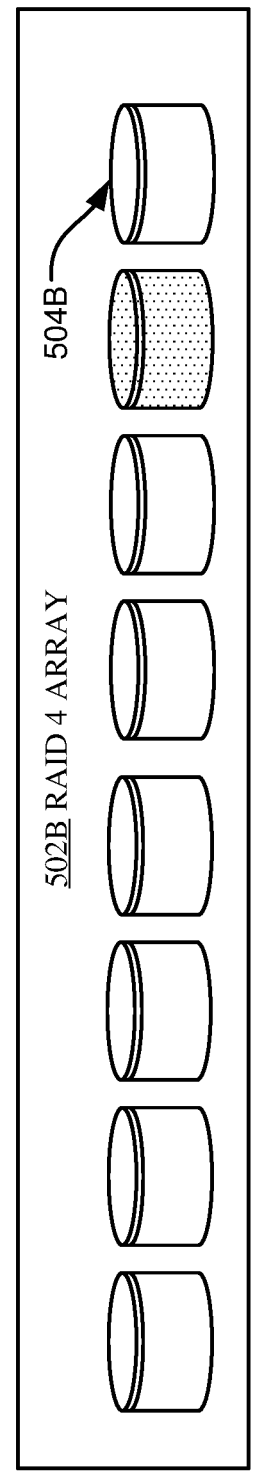
FIG. 5B illustrates a RAID 4 array having the old storage volume exchanged with a data disk, in accordance with embodiments of the present disclosure.

Aspects of the present disclosure reduce the global possibility of data loss using multiple techniques including:

1) evenly distributing older storage volumes between multiple RAID arrays of a similar type (e.g., RAID 4, RAID 5, RAID 6, RAID 10, etc.) as discussed in FIGS. 2A-2B;
2) moving older storage volumes to RAID arrays having a higher tolerance for storage volume failures (e.g., moving older storage volumes from a RAID 5 to a RAID 6, where the RAID 6 has a higher tolerance for storage volume failures compared to RAID 5) as discussed in FIGS. 3A-3B;
3) distributing older storage volumes across mirrored pairs in RAID 10 arrays (e.g., for a mirrored pair of two older storage volumes, substituting one of the older storage volumes with a newer storage volume in another mirrored pair so that no mirrored pair contains two older storage volumes) as discussed in FIGS. 4A-4B; and/or
4) substituting an older parity storage volume with a newer data storage volume in a RAID 4 array as discussed in FIGS. 5A-5B.

Thus, aspects of the present disclosure generally include the operations of 1) identifying older storage volumes in one or more RAID arrays of a storage system, and 2) exchanging one or more older storage volumes with one or more newer storage volumes in order to reduce the global probability of data loss in the storage system. Identifying older storage volumes is generally discussed hereinafter with respect to FIGS. 6-9. Exchanging storage volumes is generally discussed hereinafter with respect to FIGS. 10A-10C and 11A-11B. General illustrations of various storage systems implementing aspects of the present disclosure are illustrated in FIGS. 2A-2B, 3A-3B, 4A-4B, and 5A-5B. As discussed herein, the concept of exchanging storage volumes does not necessarily refer to physically changing locations of storage volumes. Exchanging storage volumes can instead refer to exchanging the role of two storage volumes. This can be realized by exchanging data between the storage volumes (optionally using a spare storage volume as an intermediate buffer as discussed hereinafter with respect to FIGS. 10A-10C) and can also include exchanging the corresponding metadata. This method of exchanging data can be referred to as smart rebuilding. After exchanging the data of the two storage volumes, each storage volume performs the role previously performed by the other storage volume. For example, after exchanging the data, the two storage volumes exchange the attachment to RAID arrays (for the scenario to balance two RAID arrays of a same type or the scenario to move old storage volumes to RAID 6 from RAID 5), exchange the attachment to mirrored pairs in RAID 10 array, or exchange the roles in RAID 4 array (e.g., data storage volume exchanged with parity storage volume).

Referring now to FIGS. 2A and 2B, illustrated are diagrams demonstrating the substitution of storage volumes in two similar RAID arrays to balance the distribution of older storage volumes between the two similar RAID arrays, in accordance with embodiments of the present disclosure.

FIG. 2A illustrates a first RAID 5 array 202A having eight total storage volumes and three older storage volumes, where the older storage volumes are illustrated by the patterned shading. FIG. 2A also includes a second RAID 5 array 204A having eight total storage volumes and one older storage volume. Both the first RAID 5 array 202A and the second RAID 5 array 204A can be connected to the same storage controller (e.g., device adapter, RAID controller) to form a storage system in a first configuration 200A. Aspects of the present disclosure are configured to exchange 206 an older storage volume from the first RAID 5 array 202A with a newer storage volume from the second RAID 5 array 204A in order to balance the number of older storage volumes between the first RAID 5 array 202A and the second RAID 5 array 204A.

FIG. 2B illustrates the storage system in a second configuration 200B following the exchange 206 of storage volumes between the first RAID 5 array 202B and the second RAID 5 array 204B. As can be seen in FIG. 2B, the first RAID 5 array 202B and the second RAID 5 array 204B each contain two older storage volumes. Equalizing the number of older storage volumes between the two similar RAID configurations reduces the global probability of data loss in the storage system in the second configuration 200B relative to the storage system in the first configuration 200A.

Although FIG. 2B illustrates an equal number of old storage volumes in each RAID array, embodiments are also directed to exchanging storage volumes so that the ratio of older storage volumes in one RAID array relative to old storage volumes in a second RAID array approaches one, even if it does not equal one. For example, a first RAID array can contain five older storage volumes and a second RAID array can contain no older storage volumes. By exchanging two older storage volumes from the first RAID array with two newer storage volumes from the second RAID array, a reduction in a global probability of data loss between the two RAID arrays is realized because the ratio of older storage volumes between the two RAID arrays is closer to one following the exchange (e.g., 3/2) than before the exchange (e.g., 5/0). Furthermore, although RAID 5 arrays are discussed in FIGS. 2A and 2B, other similar RAID arrays fall within the spirit and scope of the present disclosure (e.g., RAID 6 arrays).

FIGS. 3A and 3B illustrate substitution of older storage volumes between different types of RAID arrays in order to increase the number of older storage volumes in RAID arrays having a higher tolerance for storage volume failures and decrease the number of older storage volumes in RAID arrays having a lower tolerance for storage volume failures, thereby reducing the global probability of data loss in a storage array.

FIG. 3A illustrates a storage system in a first configuration 300A including a RAID 5 array 302A having two older storage volumes and a RAID 6 array 304A having two older storage volumes. As is understood by one skilled in the art, RAID 6 arrays have a higher tolerance for storage volume failures relative to RAID 5 arrays. Aspects of the present disclosure are directed to exchanging 306 an older storage volume from the RAID 5 array 302A with a newer storage volume from the RAID 6 array 304A.

FIG. 3B illustrates the storage system in the second configuration 300B resulting from the exchange 306. As can be seen in FIG. 3B, the RAID 5 array 302B contains one older storage volume and the RAID 6 array 304B contains three older storage volumes (in other words, the RAID 5 array 302B contains fewer older storage volumes than the RAID 6 array 304B). Although the distribution of older storage volumes between the RAID 5 array 302B and the RAID 6 array 304B is unequal, the global probability of data loss in the storage system having the second configuration 300B is nonetheless reduced relative to the global probability of data loss in the storage system having the first configuration 300A because the RAID 6 array 304B has a higher tolerance for storage volume failures relative to the RAID 5 array 302B.

FIGS. 4A and 4B illustrate substitution of storage volumes in mirrored pairs of older storage volumes in order to reduce the global probability of data loss in mirrored RAID configurations (e.g., RAID 10 configurations).

FIG. 4A illustrates a RAID 10 mirrored array 402A in a first configuration 400A having mirrored pairs of storage volumes 404A, 406A, 408A, and 410A. As shown in FIG. 4A, mirrored pair 410A includes two older storage volumes. Aspects of the present disclosure are directed to exchanging 412 an older storage volume in a mirrored pair 410A having two older storage volumes with a newer storage volume in a mirrored pair 408A having two newer storage volumes.

FIG. 4B illustrates the RAID 10 mirrored array 402B in a second configuration 400B following the exchange 412. As can be seen in FIG. 4B, none of the mirrored pairs 404B, 406B, 408B, 410B contains more than one older storage volume (in other words, each pair contains less than two older storage volumes). As a result, the global probability of data loss in the RAID 10 mirrored array 402B in the second configuration 400B is less than the global probability of data loss in the RAID 10 mirrored array 402A in the first configuration 400A. This is a result of the exchange 412 causing the RAID 10 mirrored array 402B in the second configuration 400B to contain no more than one older storage volume in any pair of mirrored storage volumes.

FIGS. 5A and 5B illustrate substitution of an older parity storage volume with a newer data storage volume in order to reduce the global probability of data loss in a RAID 4 array by reducing the probability of storage volume failure in the parity storage volume.

FIG. 5A illustrates a RAID 4 array 502A in a first configuration 500A. As shown in FIG. 5A, the parity storage volume 504A is an older storage volume. Aspects of the present disclosure are directed to exchanging 506 an older parity storage volume with a newer data storage volume in the RAID 4 array 502A.

FIG. 5B illustrates the RAID 4 array 502B in a second configuration 500B following the exchange 506. As shown in FIG. 5B, the parity storage volume 504B is now a newer storage volume and the older storage volume is now a data storage volume. As a result, the global probability of data loss in the RAID 4 array 502B in the second configuration 500B is reduced relative to the global probability of data loss in the RAID 4 array 502A in the first configuration 500A.

Figure 6:
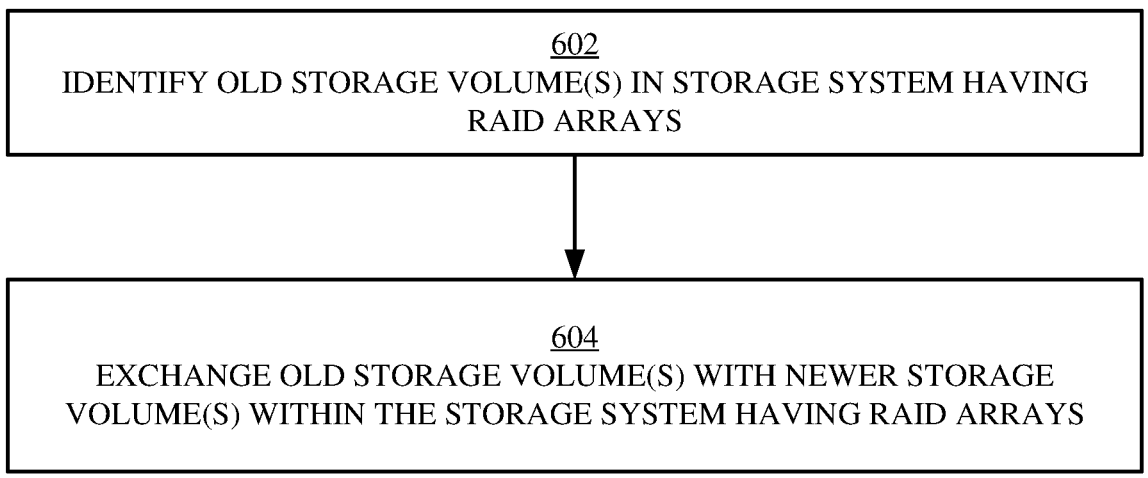
FIG. 6 is a flowchart of an example method for reducing a global probability of data loss in one or more RAID arrays, in accordance with embodiments of the present disclosure.

FIG. 6 illustrates a flowchart of an example method 600 for reducing a global probability of data loss in a storage system having one or more RAID arrays, in accordance with embodiments of the present disclosure. The method 600 can be performed by any suitable combination of hardware and/or software (e.g., storage controller 1200 of FIG. 12).

Operation 602 includes identifying one or more old storage volumes in a storage system having one or more RAID arrays. Old storage volumes can have an estimated remaining life below a threshold. Estimated remaining life can be based on write operations (e.g., total life write operations minus accumulated write operations, where the result is divided by an average write throughput to determine an estimated remaining life) or based on time (e.g., an expected lifespan minus a time of operation to determine an estimated remaining life). In addition to write operations and/or times, other factors can also account for variations in expected remaining life such as operating temperature, workload parameters, errors generated by the storage volume, and/or other factors. Identifying old storage volumes is discussed in more detail hereinafter with respect to FIGS. 7-9.

Operation 604 includes exchanging (e.g., manually, automatically, or virtually) an old storage volume with a newer storage volume within a same RAID array or in a different RAID array of the storage system. In some embodiments, the exchange uses a spare storage volume as an intermediary. In some embodiments, the exchanging ensures that the newer storage volume has a predicted remaining life exceeding the older storage volume by a predetermined threshold. As a result of the exchange, the storage system can realize a lowered global probability of data loss. Exchanging storage volumes is discussed in more detail hereinafter with respect to FIGS. 10A-10C and 11A-11B. Exchanging storage volumes can generally relate to exchanging data and/or metadata between storage volumes and/or exchanging roles of storage volumes. Thus, exchanging storage volumes can generally involve rebuilding and/or reconfiguring arrays of storage volumes.

As one example, operation 604 includes exchanging an old storage volume in a first RAID array with a second storage volume in a second RAID array, where the first and second RAID arrays are a same type (e.g., RAID 5 or RAID 6), and where exchanging the old storage volume with the second storage volume results in an even number of old storage volumes in each RAID array (e.g., see FIGS. 2A and 2B).

As another example, operation 604 includes exchanging an old storage volume in a first RAID array with a second storage volume in a second RAID array, where the first and second RAID arrays are different types of RAID arrays (e.g., RAID 5 and RAID 6), and where the second RAID array has a higher tolerance for storage volume failures than the first RAID array, and where the exchanging results in the second RAID array having a higher number of old storage volumes compared to the first RAID array (e.g., see FIGS. 3A and 3B).

As another example, operation 604 includes exchanging one of two old storage volumes in a first pair of storage volumes in a mirrored RAID array (e.g., RAID 10 mirrored array) with a second storage volume in a second pair of storage volumes of the mirrored RAID array, where as a result of the exchanging, each of the first pair of storage volumes and the second pair of storage volumes contain less than two old storage volumes (e.g., see FIGS. 4A and 4B).

As another example, operation 604 includes exchanging an old storage volume acting as a parity disk in a RAID array (e.g., RAID 4) with a data disk in the RAID array so that the parity disk is not an old storage volume (e.g., see FIGS. 5A and 5B).

Figure 7:
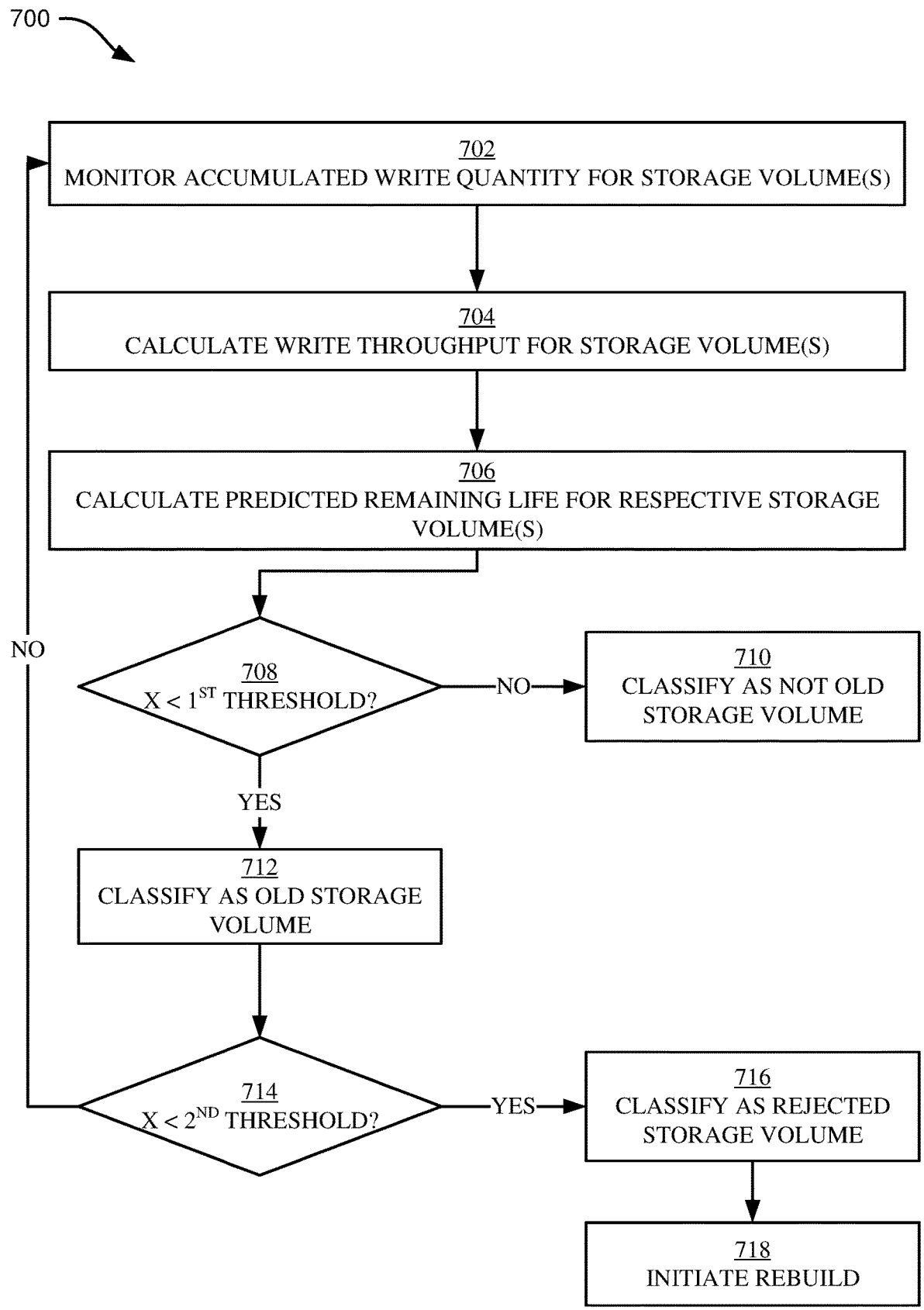
FIG. 7 is a flowchart of an example method for identifying old storage volumes in storage systems based on write operations, in accordance with embodiments of the present disclosure.

FIG. 7 illustrates a flowchart of an example method 700 for identifying an old storage volume based on an accumulated write quantity, in accordance with embodiments of the present disclosure. The method 700 can be performed by any suitable combination of hardware and/or software (e.g., storage controller 1200 of FIG. 12). In some embodiments, the method 700 is a sub-method of operation 602 of FIG. 6. The method 700 is particularly relevant to storage volumes that are solid state drives (SSDs) because the working life of a SSD is primarily a function of bytes written as defined by a vendor-supplied write endurance of the SSD.

Operation 702 includes monitoring an accumulated write quantity for one or more storage volumes (e.g., solid state drives). The accumulated write quantity can include write operations incurred on the storage volume prior to placing the storage volume in the current storage system and write operations incurred on the storage volume after placing the storage volume in the current storage system. In other words, the accumulated write quantity can refer to the total number of bytes written on a given storage volume over the life of the storage volume (e.g., from an initial date of use of the storage volume to a current date).

Operation 704 includes calculating a write throughput for one or more storage volumes. The write throughput can be an average number of write operations per increment of time (e.g., bytes/hour, bytes/day, bytes/week, etc.). The write throughput can be an average write throughput based on observing all write operations on a given storage volume for a period of time (e.g., a day, a week, etc.).

Operation 706 includes calculating a predicted remaining life for one or more storage volumes based on the accumulated write quantity determined in operation 702 and the average write throughput determined in operation 704. In some embodiments, calculating the predicted remaining life of the first storage volume is triggered when the accumulated write quantity as a proportion of the total write quantity is above a threshold (e.g., when the accumulated write quantity is 80% or greater than the total write quantity rating for the one or more storage volumes). Operation 706 is discussed in more detail hereinafter with respect to FIG. 8.

Operation 708 includes determining if the predicted remaining life is less than a first threshold. If the predicted remaining life is above the first threshold (e.g., NO at operation 708), then the method 700 proceeds to operation 710. Operation 710 includes classifying the storage volume as not an old storage volume (e.g., a newer storage volume). If the predicted remaining life is above the first threshold (e.g., YES at operation 708), then the method 700 proceeds to operation 712 and classifies the storage volume as an old storage volume.

The method 700 then proceeds to operation 714 and determines if the predicted remaining life is less than a second threshold. If the predicted remaining life is not below the second threshold (e.g., NO at operation 714), then the method 700 returns to operation 702 and continues monitoring the accumulated write quantity of the storage volume and intermittently (e.g., daily, weekly, etc.) proceeding through the operations of the method 700 (e.g., to compare an updated predicted remaining life to the first and second thresholds). If the predicted remaining life is below the second threshold (e.g., YES at operation 714), then the method 700 proceeds to operation 716 and classifies the storage volume as a rejected storage volume, and then proceeds to operation 718 and initiates a rebuild of the corresponding RAID arrays in the storage system without the rejected storage volume.

As shown in operations 714-718, aspects of the present disclosure preemptively remove storage volumes that are close to a predicted failure in order to rebuild the corresponding RAID arrays in the storage system without the rejected storage volume at a time and under a workload convenient to the storage system.

Figure 8:
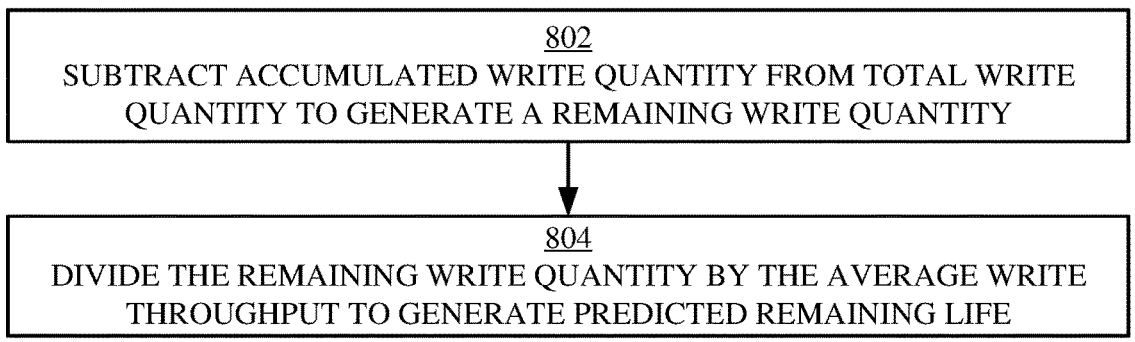
FIG. 8 is a flowchart of an example method for calculating a predicted remaining life of a storage volume based on accumulated write operations, in accordance with embodiments of the present disclosure.

FIG. 8 illustrates a flowchart of an example method 800 for calculating a predicted remaining life of a storage volume based on an accumulated write quantity and an average write throughput for the storage volume, in accordance with embodiments of the present disclosure. The method 800 can be performed by any suitable combination of hardware and/or software (e.g., storage controller 1200 of FIG. 12). In some embodiments, the method 800 is a sub-method of operation 706 of FIG. 7, and the method 800 is likewise applicable to SSDs.

Operation 802 includes subtracting an accumulated write quantity from a total write quantity to generate a remaining write quantity (e.g., total bytes minus accumulated bytes equals remaining bytes). The accumulated write quantity can be determined from operation 702 of FIG. 7. The total write quantity can be a value related to an expected number of write operations incurred on a storage volume over the useful life of the storage volume (e.g., write endurance). In some embodiments, the total write quantity is retrieved from a vendor-supplied specification of the storage volume or from testing data related to different types of storage volumes.

Operation 804 includes dividing the remaining write quantity calculated in operation 802 by an average write throughput calculated in operation 704 of FIG. 7 to generate a predicted remaining life.

Figure 9:
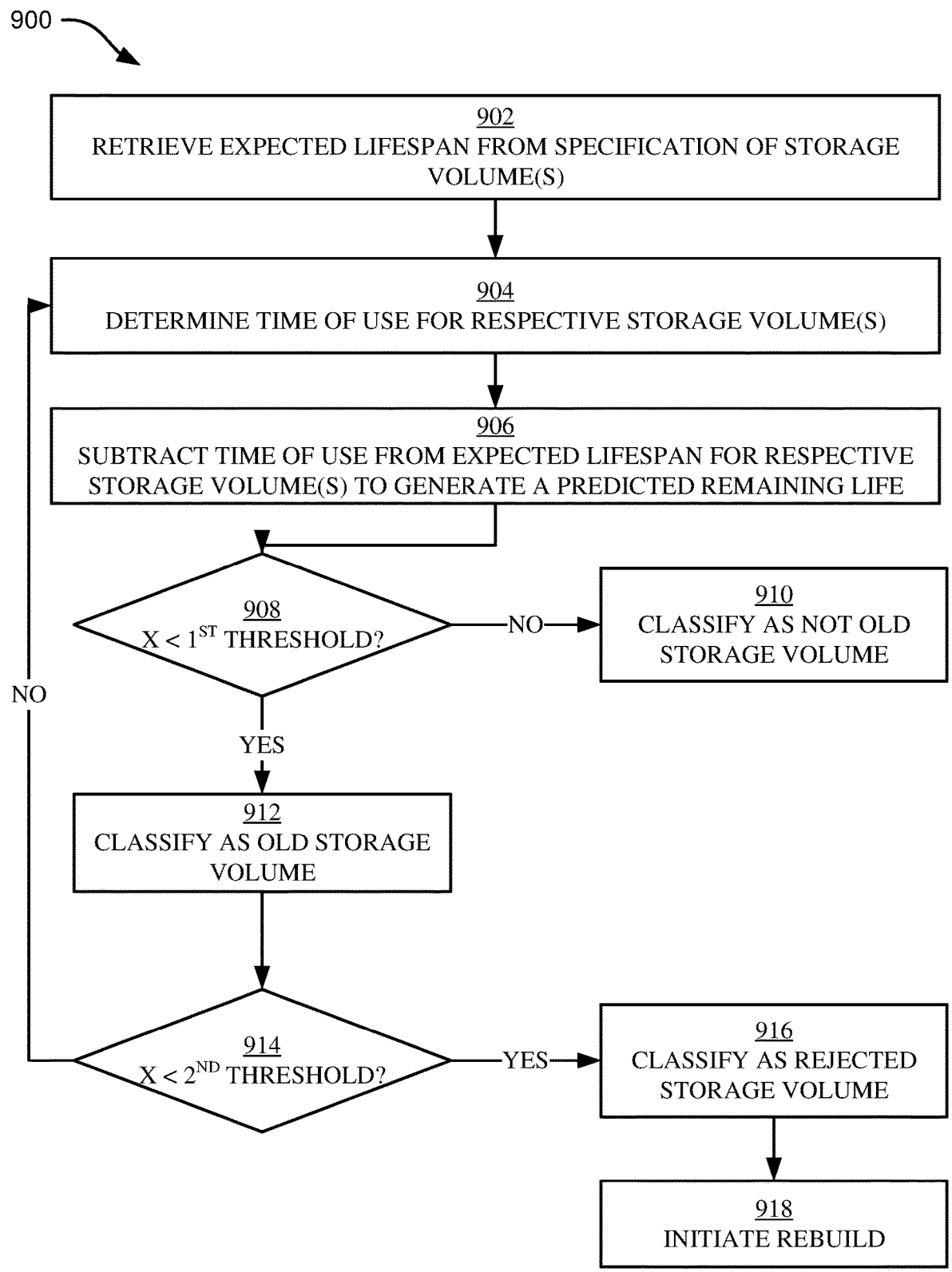
FIG. 9 is a flowchart of another example method for identifying old storage volumes in storage systems based on lifespans, in accordance with embodiments of the present disclosure.

FIG. 9 illustrates a flowchart of an example method 900 for identifying an old storage volume based on lifespans, in accordance with embodiments of the present disclosure. The method 900 can be performed by any suitable combination of hardware and/or software (e.g., storage controller 1200 of FIG. 12). In some embodiments, the method 900 is a sub-method of operation 602 of FIG. 6. The method 900 can be particularly relevant to storage volumes that are hard disk drives (HDDs) because HDDs can experience mechanical failures that are primarily a function of operational age.

Operation 902 includes retrieving an expected lifespan from a specification of a storage volume (e.g., hard disk drive). The expected lifespan can be, for example, a lifespan in operational hours the storage volume is expected to function with an associated confidence rating (e.g., 95% confidence, 99% confidence, etc.).

Operation 904 includes determining a time of use for one or more respective storage volumes, where the time of use is a total accumulated time of operation in the current storage system and any preceding storage systems the respective storage volume was used in.

Operation 906 includes subtracting the time of use determined in operation 904 from the expected lifespan determined in operation 902 to generate a predicted remaining life.

Operation 908 determines if the predicted remaining life is below a first threshold. If the predicted remaining life is not below the first threshold (e.g., NO at operation 908), the method 900 proceeds to operation 910 and classifies the storage volume as not an old storage volume (e.g., a newer storage volume).

If the predicted remaining life is below the first threshold (e.g., YES at operation 908), the method 900 proceeds to operation 912 and classifies the storage volume as an old storage volume. The method 900 then proceeds to operation 914 and determines if the predicted remaining life is below a second threshold. If the predicted remaining life is not below the second threshold (e.g., NO at operation 914), the method 900 returns to operation 904 and continues monitoring the time of use for respective storage volumes. If the predicted remaining life is below the second threshold (e.g., YES at operation 914), the method 900 proceeds to operation 916 and classifies the storage volume as a rejected storage volume and initiates rebuild operations of the corresponding RAID arrays in the storage system without the rejected storage volume in operation 918.

As shown in operations 914-918, aspects of the present disclosure preemptively remove storage volumes that are close to a predicted failure in order to rebuild the corresponding RAID arrays in the storage system without the rejected storage volume at a time and under a workload convenient to the storage system.

Figure 10A:
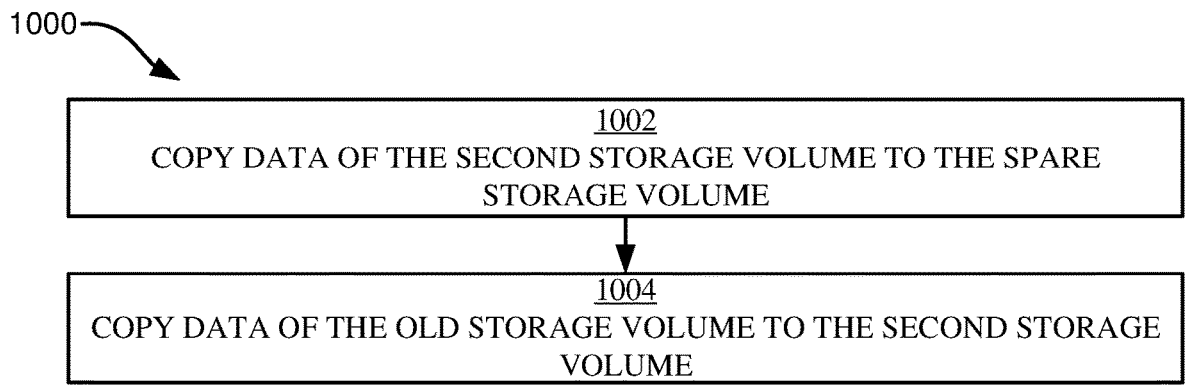
FIG. 10A is a flowchart of an example method for exchanging storage volumes in RAID arrays, in accordance with embodiments of the present disclosure.

FIG. 10A illustrates an example method 1000 for exchanging storage volumes in a storage system, in accordance with embodiments of the present disclosure. The method 1000 can be performed automatically or virtually by any suitable combination of hardware and/or software (e.g., storage controller 1200 of FIG. 12). In some embodiments, the method 1000 is a sub-method of operation 604 of FIG. 6. The method 1000 relates to exchanging an old storage volume in a first location of a first RAID array with a second storage volume (e.g., a newer storage volume) in a second location of a second RAID array using a spare storage volume of the storage system as an intermediary, and where the old storage volume is an oldest storage volume of the three storage volumes (e.g., the old storage volume, the second storage volume, and the spare storage volume).

Operation 1002 includes copying the data of the second storage volume to the spare storage volume. Operation 1002 results in the original spare storage volume functioning as the second storage volume.

Operation 1004 includes copying data of the old storage volume to the second storage volume. Operation 1004 results in the original second storage volume functioning as the old storage volume, and the original old storage volume (e.g., the oldest storage volume in this example) functioning as the spare storage volume.

Figure 10B:
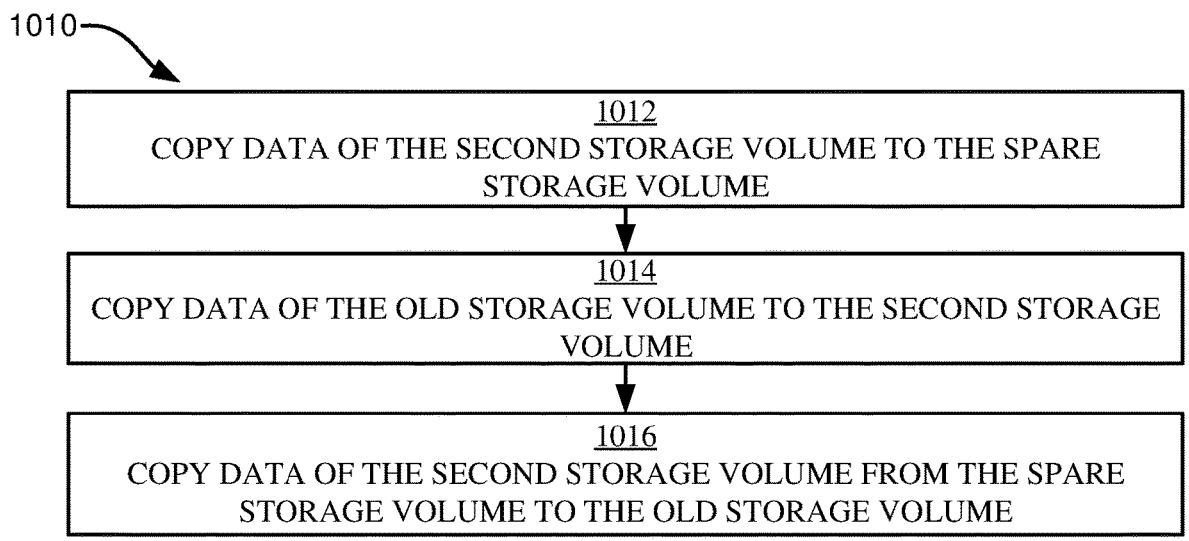
FIG. 10B is a flowchart of another example method for exchanging storage volumes in RAID arrays, in accordance with embodiments of the present disclosure.

FIG. 10B illustrates another example method 1010 for exchanging storage volumes in a storage system, in accordance with embodiments of the present disclosure. The method 1010 can be performed automatically or virtually by any suitable combination of hardware and/or software (e.g., storage controller 1200 of FIG. 1). In some embodiments, the method 1010 is a sub-method of operation 604 of FIG. 6. The method 1010 relates to exchanging data of an old storage volume in a first location of a first RAID array with data of a second storage volume (e.g., a newer storage volume) in a second location of a second RAID array using a spare storage volume of the storage system as an intermediary, and where the spare storage volume is the oldest of the three storage volumes (e.g., the old storage volume, the second storage volume, and the spare storage volume).

Operation 1012 includes copying the data of the second storage volume to the spare storage volume. Operation 1012 results in the original spare storage volume functioning as the second storage volume.

Operation 1014 includes copying the data of the old storage volume to the second storage volume. Operation 1014 results in the original second storage volume functioning as the old storage volume.

Operation 1016 includes copying the data originally from the second storage volume (and currently stored in the spare storage volume at operation 1012) from the spare storage volume to the old storage volume. Operation 1016 results in the original old storage volume functioning as the second storage volume and the spare storage volume (e.g., the oldest storage volume in this example) remaining the spare storage volume.

Figure 10C:
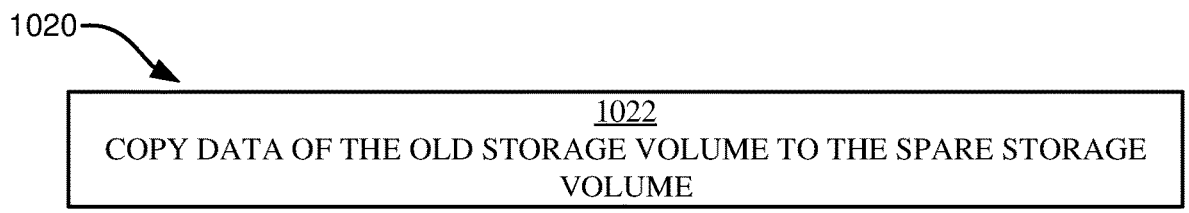
FIG. 10C is a flowchart of another example method for exchanging storage volumes in RAID arrays, in accordance with embodiments of the present disclosure.

FIG. 10C illustrates another example method 1020 for exchanging storage volumes in a storage system, in accordance with embodiments of the present disclosure. The method 1020 can be performed automatically or virtually by any suitable combination of hardware and/or software (e.g., storage controller 1200 of FIG. 1). In some embodiments, the method 1020 is a sub-method of operation 604 of FIG. 6. The method 1020 relates to exchanging data of an old storage volume in a first location of a first RAID array with data of a second storage volume (e.g., a newer storage volume) in a second location of a second RAID array, where the second storage volume is a spare storage volume.

Operation 1022 includes copying the data of the old storage volume to the spare storage volume. Operation 1022 results in the original spare storage volume functioning as the original old storage volume and the original old storage volume functioning as the spare storage volume.

Figure 11A:
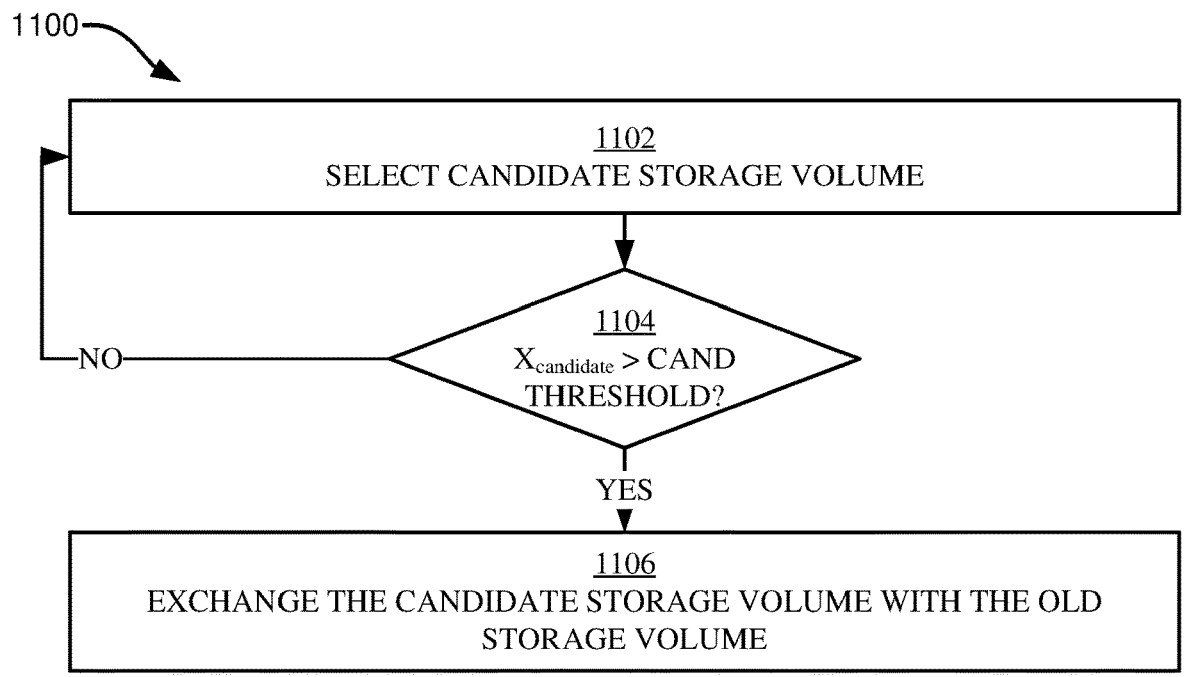
FIG. 11A is a flowchart of an example method for identifying an appropriate second storage volume to exchange with an old storage volume, in accordance with embodiments of the present disclosure.

FIG. 11A illustrates a flowchart of an example method 1100 for identifying an appropriate second storage volume to exchange with an old storage volume, in accordance with embodiments of the present disclosure. The method 1100 can be performed by any suitable combination of hardware and/or software (e.g., storage controller 1200 of FIG. 12). In some embodiments, the method 1100 is a sub-method of operation 604 of FIG. 6.

Operation 1102 includes selecting a candidate storage volume as the replacement for an old storage volume, where the candidate storage volume is another storage volume in the storage system and contained within a same RAID array or different RAID array as the old storage volume.

Operation 1104 includes determining if the predicted remaining life of the candidate storage volume ($X_{candidate}$) is greater than a candidate threshold. In some embodiments, the candidate threshold is greater than the first threshold used for identifying old storage devices (e.g., see operations 708 and 908 of FIGS. 7 and 9, respectively). If the predicted remaining life of the candidate storage volume is not greater than the candidate threshold (e.g., NO at operation 1104), the method 1100 returns to operation 1102 and selects a different candidate storage volume as the replacement for the old storage volume. If the predicted remaining life of the candidate storage volume is greater than the candidate threshold (e.g., YES as operation 1104), the method 1100 proceeds to operation 1106 and exchanges the candidate storage volume with the old storage volume.

Using a candidate threshold greater than the first threshold ensures replacing an old storage volume with a second storage volume results in a meaningful reduction in the probability of data loss.

Figure 11B:
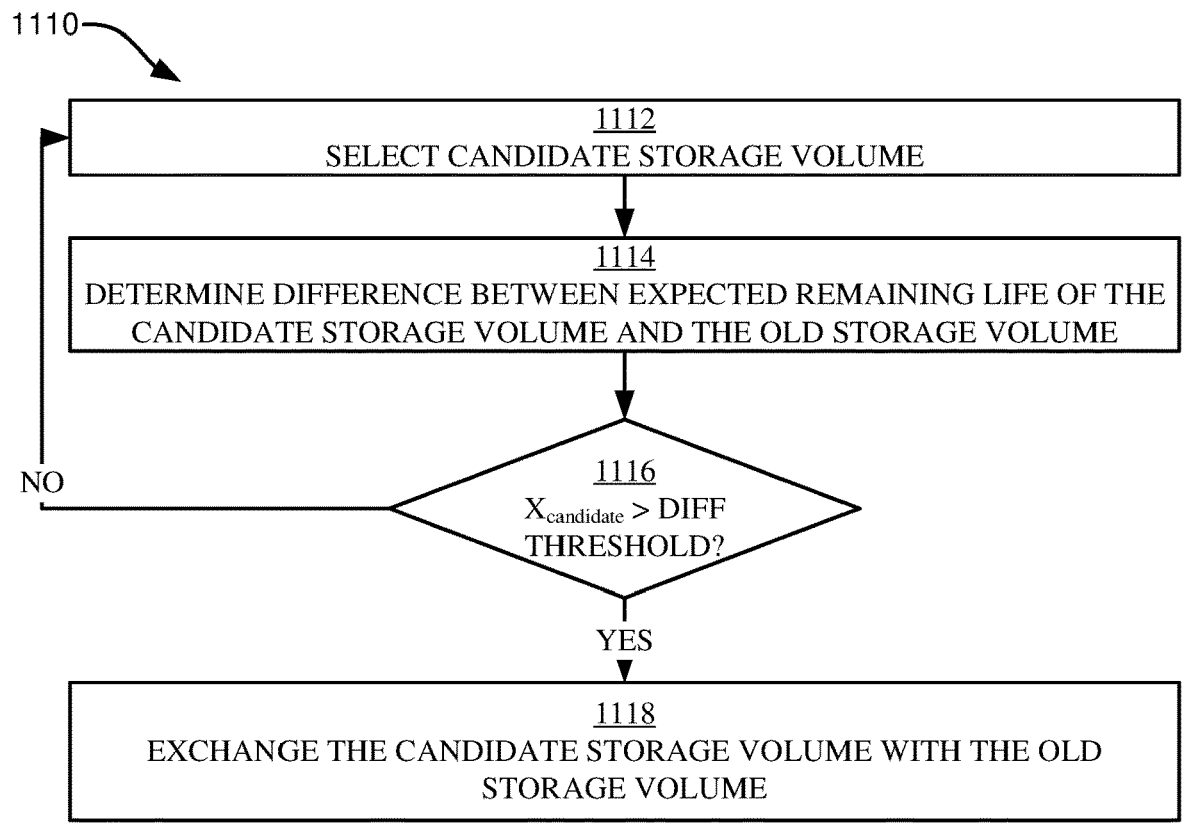
FIG. 11B is a flowchart of another example method for identifying an appropriate second storage volume to exchange with an old storage volume, in accordance with embodiments of the present disclosure.

FIG. 11B illustrates a flowchart of an example method 1110 for identifying an appropriate second storage volume to exchange with an old storage volume, in accordance with embodiments of the present disclosure. The method 1110 can be performed by any suitable combination of hardware and/or software (e.g., storage controller 1200 of FIG. 12). In some embodiments, the method 1100 is a sub-method of operation 604 of FIG. 6.

Operation 1112 includes selecting a candidate storage volume as the replacement for an old storage volume, where the candidate storage volume is another storage volume in the storage system and contained within a same RAID array or different RAID array as the old storage volume.

Operation 1114 includes determining a difference between an expected remaining life of the candidate storage volume and the old storage volume. The difference can be related to an amount of write operations remaining for each of the storage volumes, an amount of time remaining for each of the storage volumes, or a different metric.

Operation 1116 includes determining if the difference calculated in operation 1114 is greater than a difference threshold. Comparing the difference to a difference threshold can be useful for ensuring that the replacement volume has a meaningful additional amount of life remaining compared to the old storage volume.

If the difference is not greater than the difference threshold (e.g., NO at operation 1116), then the method 1110 returns to operation 1112 and selects a different candidate storage volume. If the difference is greater than the difference threshold (e.g., YES at operation 1116), then the method 1110 proceeds to operation 1118 and exchanges the candidate storage volume with the old storage volume.

Figure 12:
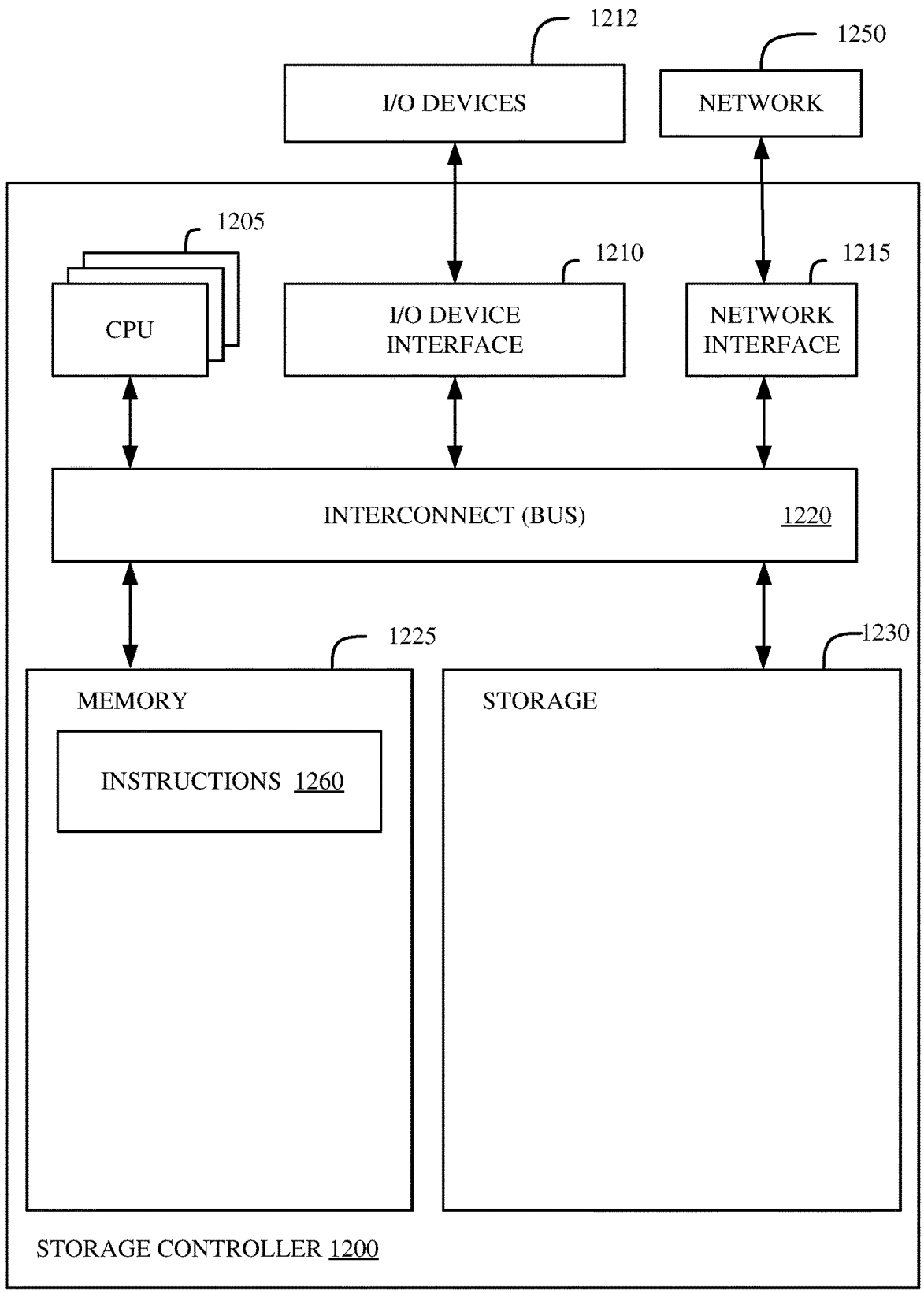
FIG. 12 illustrates a block diagram of an example storage controller, in accordance with embodiments of the present disclosure.

FIG. 12 illustrates a block diagram of an example storage controller 1200 in accordance with some embodiments of the present disclosure. Storage controller 1200 can be a device adapter, RAID controller, or other combinations of hardware and/or software configured to manage a physical or virtual storage system having one or more similar or dissimilar RAID arrays.

In various embodiments, storage controller 1200 can perform the methods described in FIGS. 6-11 and/or the functionality discussed in FIGS. 1-5. In some embodiments, the storage controller 1200 receives instructions related to aforementioned methods and functionalities by downloading processor-executable instructions from a remote data processing system via a network 1250. In other embodiments, storage controller 1200 provides instructions for the aforementioned methods and/or functionalities to a client machine such that the client machine executes the method, or a portion of the method, based on the instructions provided by the storage controller 1200.

The storage controller 1200 includes a memory 1225, storage 1230, an interconnect (e.g., BUS) 1220, one or more CPUs 1205 (also referred to as processors 1205 herein), an I/O device interface 1210, I/O devices 1212, and a network interface 1215.

Each CPU 1205 retrieves and executes programming instructions stored in the memory 1225 or storage 1230. The interconnect 1220 is used to move data, such as programming instructions, between the CPUs 1205, I/O device interface 1210, storage 1230, network interface 1215, and memory 1225. The interconnect 1220 can be implemented using one or more busses. The CPUs 1205 can be a single CPU, multiple CPUs, or a single CPU having multiple processing cores in various embodiments. In some embodiments, a CPU 1205 can be a digital signal processor (DSP). In some embodiments, CPU 1205 includes one or more 3D integrated circuits (3DICs) (e.g., 3D wafer-level packaging (3DWLP), 3D interposer based integration, 3D stacked ICs (3D-SICs), monolithic 3D ICs, 3D heterogeneous integration, 3D system in package (3DSiP), and/or package on package (PoP) CPU configurations). Memory 1225 is generally included to be representative of a random access memory (e.g., static random access memory (SRAM), dynamic random access memory (DRAM), or Flash). The storage 1230 is generally included to be representative of a non-volatile memory, such as a hard disk drive, solid state device (SSD), removable memory cards, optical storage, or flash memory devices. In an alternative embodiment, the storage 1230 can be replaced by storage area-network (SAN) devices, the cloud, or other devices connected to the storage controller 1200 via the I/O device interface 1210 or a network 1250 via the network interface 1215.

In some embodiments, the memory 1225 stores instructions 1260. However, in various embodiments, the instructions 1260 are stored partially in memory 1225 and partially in storage 1230, or they are stored entirely in memory 1225 or entirely in storage 1230, or they are accessed over a network 1250 via the network interface 1215.

Instructions 1260 can be processor-executable instructions for performing any portion of, or all of, any of the methods of FIGS. 6-11 and/or any of the functionality discussed in FIGS. 1-5.

In various embodiments, the I/O devices 1212 include an interface capable of presenting information and receiving input. For example, I/O devices 1212 can present information to a user interacting with storage controller 1200 and receive input from the user.

Storage controller 1200 is connected to the network 1250 via the network interface 1215. Network 1250 can comprise a physical, wireless, cellular, or different network.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 13:
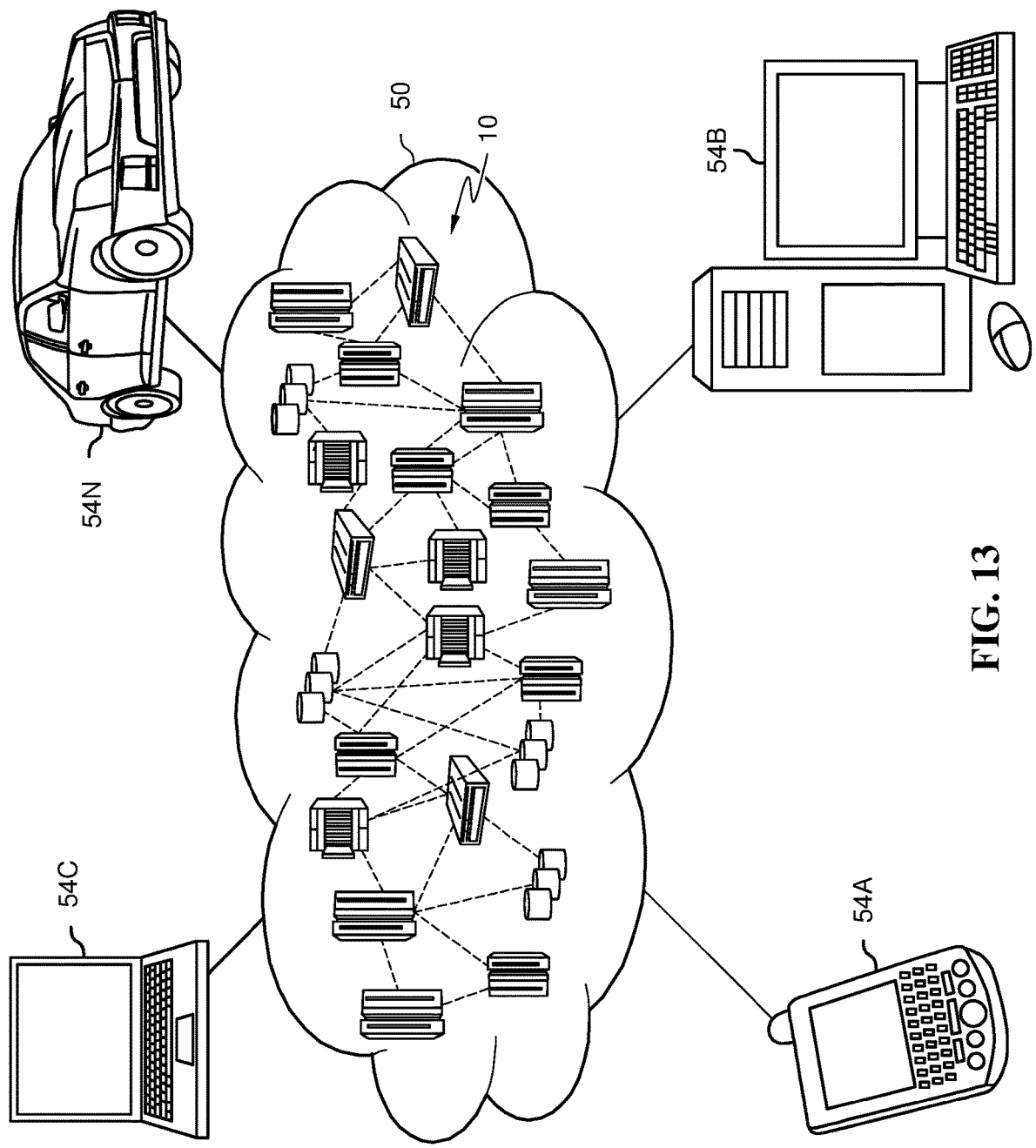
FIG. 13 depicts a cloud computing environment, according to some embodiments of the present disclosure.

Referring now to FIG. 13, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 13 are intended to be illustrative only and that computing nodes 10 and cloud computing environment 50 can communicate with any type of computerized device over any type of network and/or network addressable connection (e.g., using a web browser).

Figure 14:
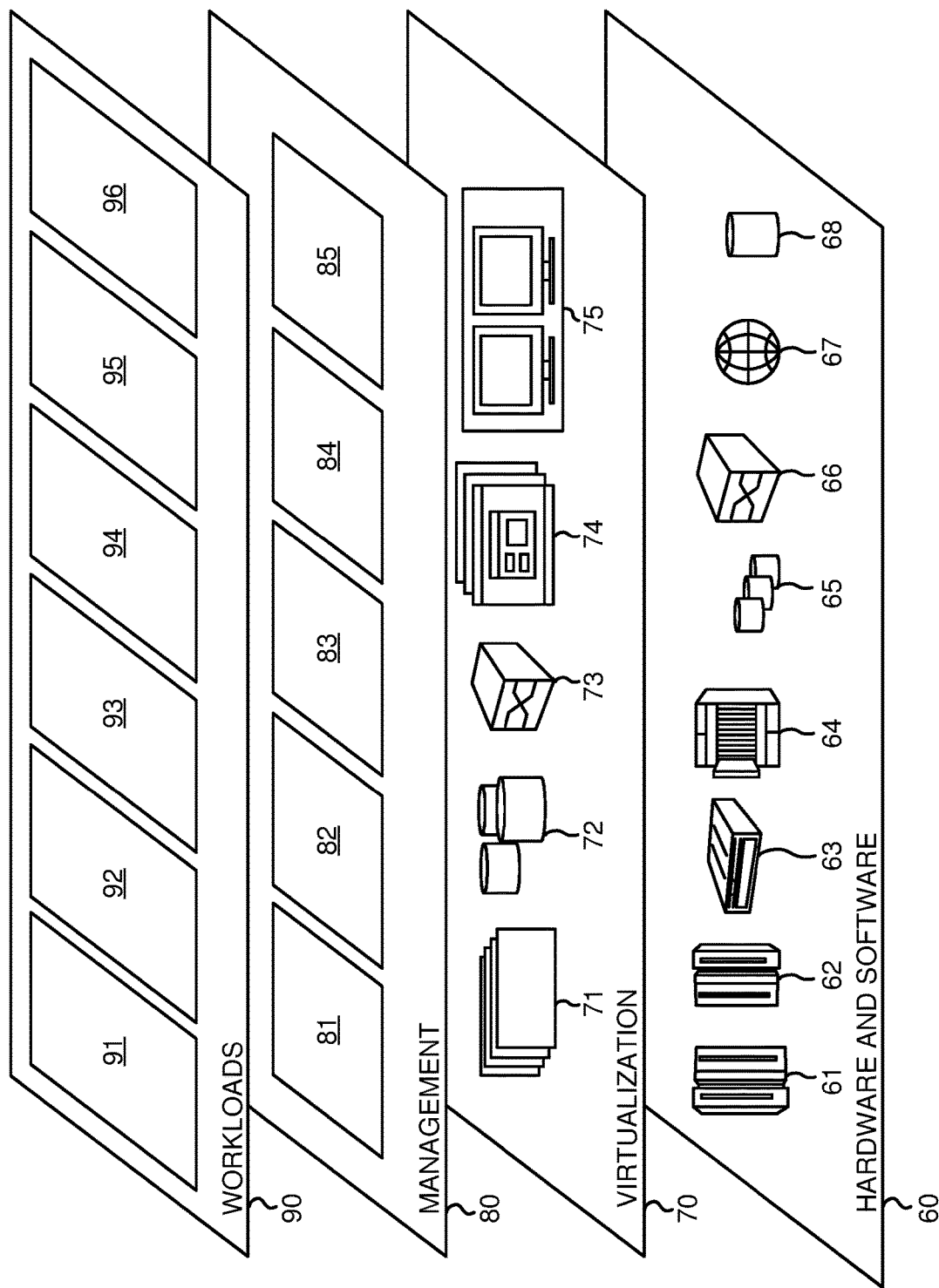
FIG. 14 depicts abstraction model layers, according to some embodiments of the present disclosure.

Referring now to FIG. 14, a set of functional abstraction layers provided by cloud computing environment 50 (FIG. 13) is shown. It should be understood in advance that the components, layers, and functions shown in FIG. 14 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and storage system management 96.

Embodiments of the present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or subset of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While it is understood that the process software (e.g., any of the instructions stored in instructions 1260 of FIG. 12 and/or any software configured to perform any subset of the methods described with respect to FIGS. 6-11 and/or any of the functionality discussed in FIGS. 1-5) can be deployed by manually loading it directly in the client, server, and proxy computers via loading a storage medium such as a CD, DVD, etc., the process software can also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

Embodiments of the present invention can also be delivered as part of a service engagement with a client corporation, nonprofit organization, government entity, internal organizational structure, or the like. These embodiments can include configuring a computer system to perform, and deploying software, hardware, and web services that implement, some or all of the methods described herein. These embodiments can also include analyzing the client's operations, creating recommendations responsive to the analysis, building systems that implement subsets of the recommendations, integrating the systems into existing processes and infrastructure, metering use of the systems, allocating expenses to users of the systems, and billing, invoicing (e.g., generating an invoice), or otherwise receiving payment for use of the systems.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding the various embodiments. But, the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A method for reducing a probability of data loss in a storage system having redundant arrays of independent disks (RAID), the method comprising:
   identifying an old storage volume in a first location of a first RAID array of the storage system by:
      determining an accumulated write quantity for a first storage volume;
      calculating a predicted remaining life of the first storage volume by subtracting the accumulated write quantity from a total write quantity to generate a remaining write quantity, and dividing the remaining write quantity by an average write throughput;
      determining the predicted remaining life is below a first threshold; and
      classifying the first storage volume as the old storage volume;
   exchanging the old storage volume in the first location of the first RAID array with a second storage volume in a second location of a second RAID array of the storage system, wherein the first RAID array and the second RAID array are a same type of RAID array, and wherein exchanging the old storage volume with the second storage volume causes the first RAID array to have an equal number of old storage volumes as the second RAID array;
   determining, in response to exchanging the old storage volume with the second storage volume, that an updated predicted remaining life of the old storage volume is below a second threshold;
   classifying the old storage volume as a rejected storage volume in response to determining that the updated predicted remaining life is below the second threshold; and
   rebuilding the second RAID array associated with the rejected storage volume.

2. The method of claim 1, wherein the first RAID array and the second RAID array are selected from a group consisting of: two RAID 5 arrays, and two RAID 6 arrays.

3. The method of claim 1, wherein the old storage volume and the second storage volume are solid state drives.

4. The method of claim 1, wherein the old storage volume and the second storage volume are hard disk drives.

5. The method of claim 1, wherein the total write quantity is a first number of bytes the first storage volume is rated to incur during a working life of the first storage volume.

6. The method of claim 1, wherein the accumulated write quantity is a second number of bytes the first storage volume incurred from an initial date to a current date.

7. The method of claim 1, wherein the average write throughput is an average bytes per unit time.

8. The method of claim 7, wherein the average write throughput is calculated based on data from the first storage volume collected over a predetermined period of time.

9. The method of claim 1, wherein calculating the predicted remaining life of the first storage volume occurs repeatedly at each predetermined period of time.

10. The method according to claim 1, wherein exchanging the old storage volume with the second storage volume further comprises:
    determining that an expected remaining life of the second storage volume is above a third threshold, wherein the third threshold is greater than the first threshold.

11. The method according to claim 1, wherein exchanging the old storage volume with the second storage volume further comprises:
    determining that a difference determined by subtracting an expected remaining life of the old storage volume from an expected remaining life of the second storage volume is above a difference threshold.

12. The method of claim 1, wherein exchanging the old storage volume with the second storage volume further comprises:
    copying data of the second storage volume to a spare storage volume;
    copying data of the old storage volume to the second storage volume; and
    copying data of the second storage volume from the spare storage volume to the old storage volume.

13. The method of claim 12, wherein the spare storage volume is older than the old storage volume and the second storage volume.

14. The method according to claim 1, wherein the method is performed by a storage controller executing instructions downloaded from a remote data processing system via a network, wherein the storage controller interfaces with the first RAID array and the second RAID array, and wherein the method further comprises:
    metering usage of the instructions; and
    generating an invoice based on metering the usage of the instructions.

15. A method for reducing a probability of data loss in a storage system having redundant arrays of independent disks (RAID), the method comprising:
    identifying an old storage volume in a first location of a first RAID array of the storage system;
    exchanging the old storage volume in the first location of the first RAID array with a second storage volume in a second location of a second RAID array of the storage system, wherein the first RAID array and the second RAID array are different types of RAID arrays, wherein the second RAID array has a higher tolerance for storage volume failures relative to the first RAID array, and wherein exchanging the old storage volume with the second storage volume causes the first RAID array to have fewer old storage volumes than the second RAID array;
    determining, in response to exchanging the old storage volume with the second storage volume, that an updated predicted remaining life of the old storage volume is below a second threshold;
    classifying the old storage volume as a rejected storage volume in response to determining that the updated predicted remaining life is below the second threshold; and
    rebuilding the second RAID array associated with the rejected storage volume.

16. The method of claim 15, wherein the first RAID array is a RAID 5 array, and wherein the second RAID array is a RAID 6 array.

17. The method of claim 15, wherein identifying the old storage volume comprises:
    determining an accumulated write quantity for a first storage volume;
    calculating a predicted remaining life of the first storage volume by subtracting the accumulated write quantity from a total write quantity to generate a remaining write quantity, and dividing the remaining write quantity by an average write throughput;
    determining the predicted remaining life is below a first threshold; and
    classifying the first storage volume as the old storage volume.

18. The method of claim 15, wherein the method is performed by a storage controller executing instructions downloaded from a remote data processing system via a network, wherein the storage controller interfaces with the first RAID array and the second RAID array, and wherein the method further comprises:
  metering usage of the instructions; and
  generating an invoice based on metering the usage of the instructions.

19. A method for reducing a probability of data loss in a storage system having redundant arrays of independent disks (RAID) with mirrored pairs of storage volumes, the method comprising:
  identifying a first pair of storage volumes having two old storage volumes in a RAID 10 mirrored array by:
    determining an accumulated write quantity for a first storage volume;
    calculating a predicted remaining life of the first storage volume by subtracting the accumulated write quantity from a total write quantity to generate a remaining write quantity, and dividing the remaining write quantity by an average write throughput;
    determining the predicted remaining life is below a first threshold; and
    classifying the first storage volume as one of the two old storage volumes of the first pair of storage volumes;
  exchanging the first storage volume of the first pair of storage volumes with a second storage volume of a second pair of storage volumes, wherein the second pair of storage volumes contains no old storage volumes, and wherein, as a result of the exchanging, the first pair of storage volumes and the second pair of storage volumes in the RAID 10 mirrored array each contain less than two old storage volumes;
  determining, in response to exchanging the first storage volume with the second storage volume, that an updated predicted remaining life of the first storage volume is below a second threshold;
  classifying the first storage volume as a rejected storage volume in response to determining that the updated predicted remaining life is below the second threshold; and
  rebuilding the RAID 10 mirrored array associated with the rejected storage volume.

20. The method of claim 19, wherein the method is performed by a storage controller executing instructions downloaded from a remote data processing system via a network, wherein the storage controller interfaces with the RAID 10 mirrored array, and wherein the method further comprises:
  metering usage of the instructions; and
  generating an invoice based on metering the usage of the instructions.

* * * * *